(12) United States Patent
Partheymüller

(10) Patent No.: US 10,797,549 B2
(45) Date of Patent: Oct. 6, 2020

(54) ELECTRIC MOTOR

(71) Applicant: SEW-EURODRIVE GMBH & CO. KG, Bruchsal (DE)

(72) Inventor: Alexander Partheymüller, Karlsruhe (DE)

(73) Assignee: SEW-EURODRIVE GMBH & CO. KG (DE)

(*) Notice: Subject to any disclaimer, the term of this patent is extended or adjusted under 35 U.S.C. 154(b) by 482 days.

(21) Appl. No.: 15/559,794

(22) PCT Filed: Feb. 15, 2016

(86) PCT No.: PCT/EP2016/000251
§ 371 (c)(1),
(2) Date: Sep. 19, 2017

(87) PCT Pub. No.: WO2016/146232
PCT Pub. Date: Sep. 22, 2016

(65) Prior Publication Data
US 2018/0069444 A1    Mar. 8, 2018

(30) Foreign Application Priority Data

Mar. 19, 2015  (DE) .................. 10 2015 003 468

(51) Int. Cl.
*H02K 1/30*    (2006.01)
*H02K 7/102*   (2006.01)
(Continued)

(52) U.S. Cl.
CPC .............. *H02K 1/30* (2013.01); *H02K 1/272* (2013.01); *H02K 7/1023* (2013.01); *H02K 15/16* (2013.01)

(58) Field of Classification Search
CPC ........ H02K 1/30; H02K 1/272; H02K 7/1023; H02K 15/16
See application file for complete search history.

(56) References Cited

U.S. PATENT DOCUMENTS

2008/0054751 A1* 3/2008 Hoshino .............. H02K 15/022
                                                          310/216.114
2008/0054767 A1* 3/2008 Groening ............ F16C 32/0493
                                                          310/75 R
2013/0307364 A1  11/2013 Marvin et al.

FOREIGN PATENT DOCUMENTS

CN       101135345 A       3/2008
CN       203233272 U      10/2013
(Continued)

OTHER PUBLICATIONS

International Preliminary Report on Patentability, dated Sep. 19, 2017, in International Application No. PCT/EP2016/000251. (English-language translation).

(Continued)

*Primary Examiner* — Jue Zhang
(74) *Attorney, Agent, or Firm* — Carter, DeLuca & Farrell LLP

(57) ABSTRACT

An electric motor, e.g., a bearing-free electric motor, includes a rotor and stator. The rotor has a rotor shaft on which a rotor packet is mounted and connected to the rotor shaft in a torsionally fixed manner. The rotor packet includes rotor segments that are stacked on top of one another in the axial direction, and a centering disk as well as a press-fit connection device, in particular a shrink-fit connection device having a shrink disk and compression rings. The stack, which includes the rotor segments, is situated between the centering disk and the press-fit connection device.

20 Claims, 5 Drawing Sheets

(51) Int. Cl.
*H02K 15/16* (2006.01)
*H02K 1/27* (2006.01)

(56) References Cited

FOREIGN PATENT DOCUMENTS

| | | |
|---|---|---|
| DE | 4130111 A1 | 3/1993 |
| DE | 10 2006 040 611 A1 | 3/2008 |
| DE | 102012212295 A1 | 1/2014 |
| EP | 1 892 817 A1 | 2/2008 |
| EP | 1 895 641 A2 | 3/2008 |
| WO | 2007/111425 A1 | 10/2007 |
| WO | 2014/185229 A1 | 11/2014 |

OTHER PUBLICATIONS

International Search Report dated Jun. 1, 2016, in International Application No. PCT/EP2016/000251. (English-language translation).

E. Fritzemeier: "Spannsysteme für Torquemotoren—Torquemotoren mit zylindrischen Wellen oder Hohlwellen verbinden" VDI-BERICHTE NR. 2004 2007, pp. 487-501.

* cited by examiner

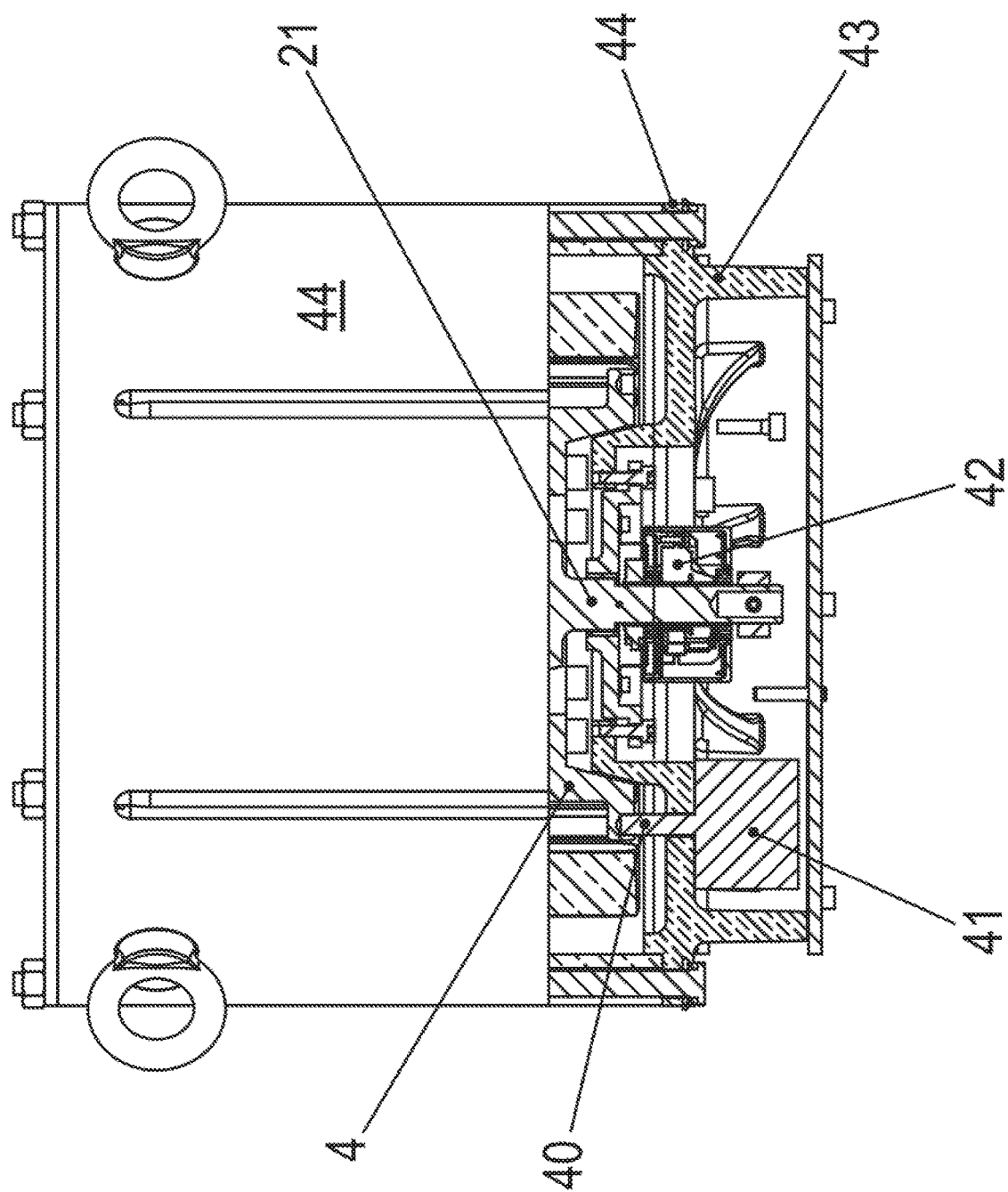

ELECTRIC MOTOR

FIELD OF THE INVENTION

The present invention relates to an electric motor.

BACKGROUND INFORMATION

It is generally known that an electric motor has a rotor shaft which is rotatably mounted relative to the stator.

SUMMARY

Example embodiments of the present invention provide a bearing-free drive element for a device to be driven.

According to an example embodiment of the present invention, an electric motor, e.g., a bearing-free electric motor, includes a rotor and a stator, the rotor including a rotor shaft on which a rotor packet is mounted and connected to the rotor shaft in a torsionally fixed manner. The rotor packet includes rotor segments that are stacked on top of one another in the axial direction, and a centering disk as well as a press-fit device, in particular a shrink-disk device that includes a shrink disk and compression rings. The stack that includes the rotor segments is situated between the centering disk and the press-fit device.

This offers the advantage that the rotor is preassembled together with the press-fit device and is thus able to be fastened to the stator, in particular with the aid of the centering disk, which performs the centering at the stator in the process and is also connected to the stator for the fastening, in particular to a flange part of the stator. Only during the connection of the rotor to the shaft to be driven, for which purpose the press-fit device is operated, is the connection of the centering disk to the stator released again, in particular the connection to the flange part of the stator, so that the rotor is adapted to be rotatable relative to the stator.

The press-fit may be retainable by the clamping screws, especially during transport of the electric motor, and especially prior to its mounting on a device to be driven. This is considered advantageous inasmuch as the press-fit device is retained on the rotor.

The press-fit may be be operated with the aid of a clamping screw or clamping screws in order to establish a press-fit connection between the rotor shaft and a shaft to be driven, in particular a hollow shaft. When actuating the clamping screws, i.e. screwing the clamping screws into a part of the press-fit device, a press-fit connection of the rotor shaft to a shaft to be driven is able to be established. This is considered advantageous because the clamping screws are used not only for holding together the packet made up of the rotor segments but also for actuating the press-fit device.

The electric motor may include a flange part, which is connected to the stator, in particular to the stator housing. This is considered advantageous since it allows the centering disk to be aligned at and secured to the flange part. The flange part is provided with a conical surface section for this purpose, which is arranged to match a conical surface section of the centering disk.

Clamping screws may be guided through recesses of the rotor segments and/or the centering disk, and the clamping device may be used for clamping the stack between the centering disk and the press-fit device, the clamping screws, e.g., being positioned in the axial direction, i.e. in the direction of the rotor axis, in particular. This is considered advantageous inasmuch as the clamping operation is easy to carry out.

The clamping screws may be screwed into a respective threaded bore of a part of the press-fit device, in particular at least partially screwed in, the head of a respective clamping screw in particular resting against the centering disk and, in particular, pressing the centering disk in the direction of the stack. This offers the advantage that the clamping screws may be screwed into a ring part and may consequentially axially displace the ring part, whereby the press-fit device is able to be operated.

Permanent magnets may be disposed on the radially outer circumference of the respective rotor segment; the rotor segment in particular has a laminated core, on whose radially outer circumference of the respective rotor segment permanent magnets are situated. This is considered advantageous inasmuch as the motor may be arranged as a synchronous motor, and/or inasmuch as repelling magnetic forces between the rotor segments are able to be overcome with the aid of the clamping screws.

The press-fit device may include a shrink disk and compression rings, and the outer surface of the shrink disk may include two conical sections on which the compression rings are situated in a displaceable manner; with the aid of screws, the clamping screws are able to be connected to at least one of the compression rings. In this context, it may be provided that a shrink disk connection of a simple configuration may be used as the press-fit device.

A conical section may be provided on the surface of the centering disk, and the flange part may have a corresponding conical section on its surface, so that the two conical sections are resting against each other in at least one section, or sectionally. The centering disk is connected to the flange part in a detachable manner, in particular with the aid of screws, especially during transport of the motor, i.e. especially prior to its mounting on a device to be driven. This is considered advantageous insofar as it allows for centering of the rotor with respect to the stator via the conical surface sections of the centering disk and the flange part. In other words, the rotor is already aligned relative to the stator during transport of the bearing-free motor, prior to its connection to the device to be driven.

The centering disk may include additional recesses that are disposed at regular intervals from one another in the circumferential direction. This is considered advantageous inasmuch as an uncomplicated, form-locking engagement of a locking element, in particular a tappet, is possible, and the locking may be implemented at small angular distances.

Additional first recesses are disposed at a first radial distance and additional second recesses are disposed at a second radial distance, the first radial distance being greater than the second radial distance, the additional first recesses and/or the additional second recesses may be spaced apart from one another at regular intervals in the circumferential direction. This is considered advantageous because an even finer angular clearance is achievable for the locking positions.

At least one electromagnet, which may be arranged as a tractive electromagnet, in particular, and by which an individual tappet is able to be moved counter to the spring force generated by a spring element, may be disposed on the flange part, in particular such that the respective tappet is able to engage with one of the additional recesses in each case. This is considered advantageous inasmuch as the locking is able to be operated electromagnetically.

The tappet may be pulled away from the centering disk when the electromagnet is energized, and the spring element may press the tappet into one of the additional recesses when the electromagnet is not energized. This is considered advantageous insofar as a retaining function is able to be obtained in the event of a power failure.

The angular distance between a respective additional recess and the respective closest adjacent additional recess in the circumferential direction may be between between 1° and 5° in each case, a respective tappet being disposed at the same radial distance as an additional recess. This is considered advantageous because a very fine angular distance is able to be achieved in connection with the retaining function.

At least two electromagnets, which may be arranged as tractive electromagnets, may be disposed at a different radial distances, and the respective tappets, which the respective electromagnet is able to move counter to the spring force generated by a respective spring element, may likewise be disposed at different radial distances. This is considered advantageous because an even finer angular spacing is able to be achieved in connection with the retaining function.

The flange part may be connected to a cover part such that the electromagnets and an angle sensor are surrounded by the flange part together with the cover part in the manner of a housing. This is considered advantageous because the electromagnets are situated in a protected manner.

Further features and aspects of example embodiments of the present invention are described in greater detail with reference to the Figures.

BRIEF DESCRIPTION OF THE DRAWINGS

FIG. 5 shows a cross-section through the subregion of the electric motor, in which tappet 40 is projecting into recess 45.

DETAILED DESCRIPTION

Figure 1:
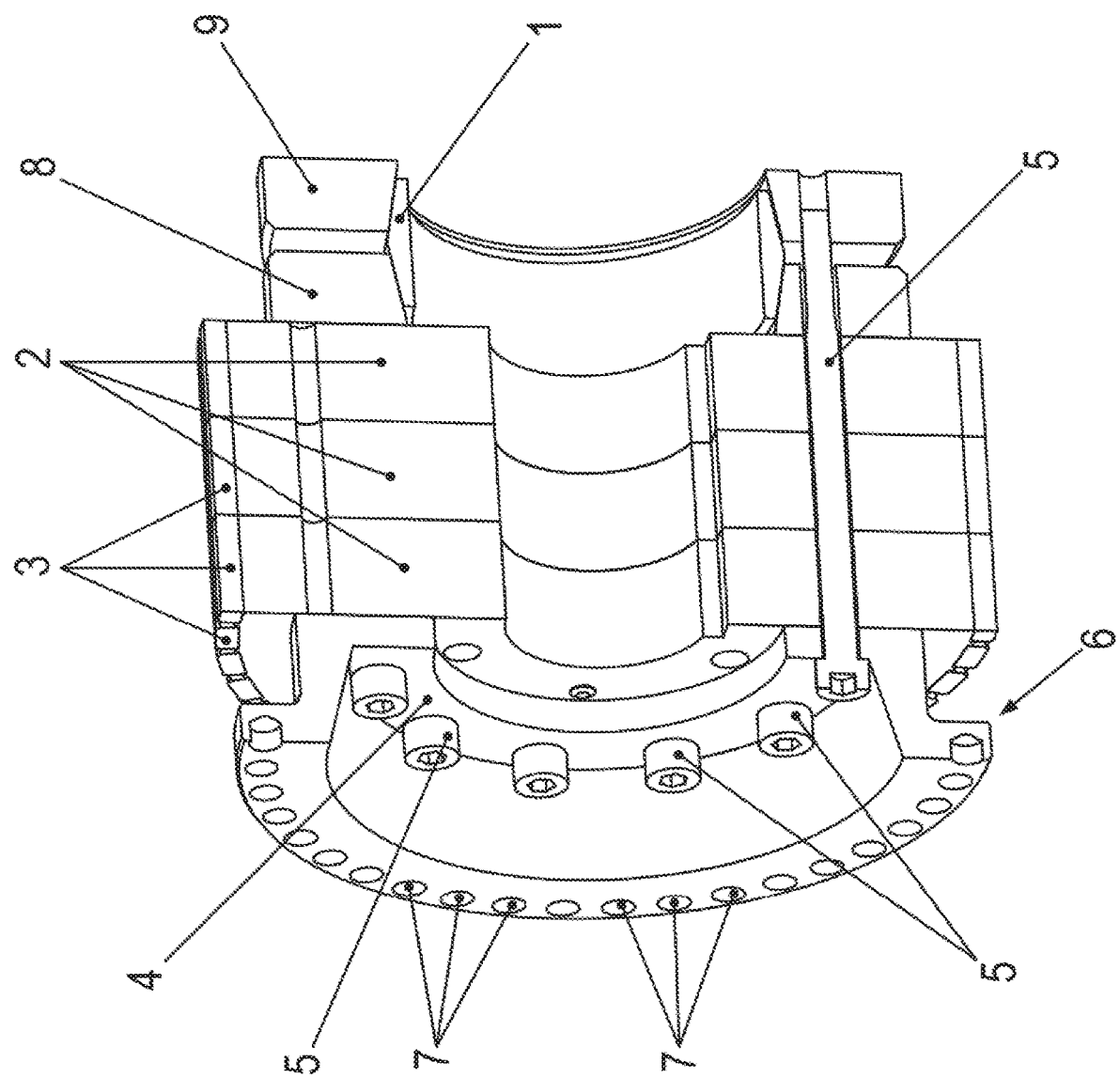
FIG. 1 shows an oblique view of the sectioned rotor of an electric motor according to an example embodiment of the present invention, in which rotor shaft 23 has been left out.

As illustrated in FIG. 1, the rotor packet provided for a connection to rotor shaft 23 is made up of rotor segments 2 that are stacked in the axial direction. A shrink disk 1 is situated in the first axial end region, and a centering disk 2 is situated in the other axial end region.

Permanent magnets 3 are disposed on the radially outer surface of rotor segments 2, in particular bonded to the surface. The extension of respective permanent magnets 3 in the axial direction does not exceed the axial extension of a respective rotor segment 2.

Rotor segments 2, shrink disk 1, and centering disk 4 are held together with the aid of axially oriented clamping screws 5. Rotor segments 2 and centering disk 4 have been provided with axially uninterrupted recesses through which clamping screws 5 are guided, which are screwed into threaded bores of a compression ring 9, compression ring 9 causing shrink disk 1 to shrink onto hollow shaft 24. In the process, the screw heads of clamping screws 5 exert pressure on centering disk 4, which is thus pressed onto rotor segments 2, thereby causing rotor segments 2 to be compressed in the axial direction and being pressed against shrink disk 1.

Clamping screws 5 are evenly spaced apart from one another in the circumferential direction.

Rotor segments 2 may have an identical axial width.

In its end region facing away from rotor segments 2, centering disk 4 is provided with a radially widened collar section 6. This collar section 6 includes recesses 7, which are implemented in the form of blind holes, all having the same radial distance and being situated at regular intervals from one another in the circumferential direction.

Figure 2:
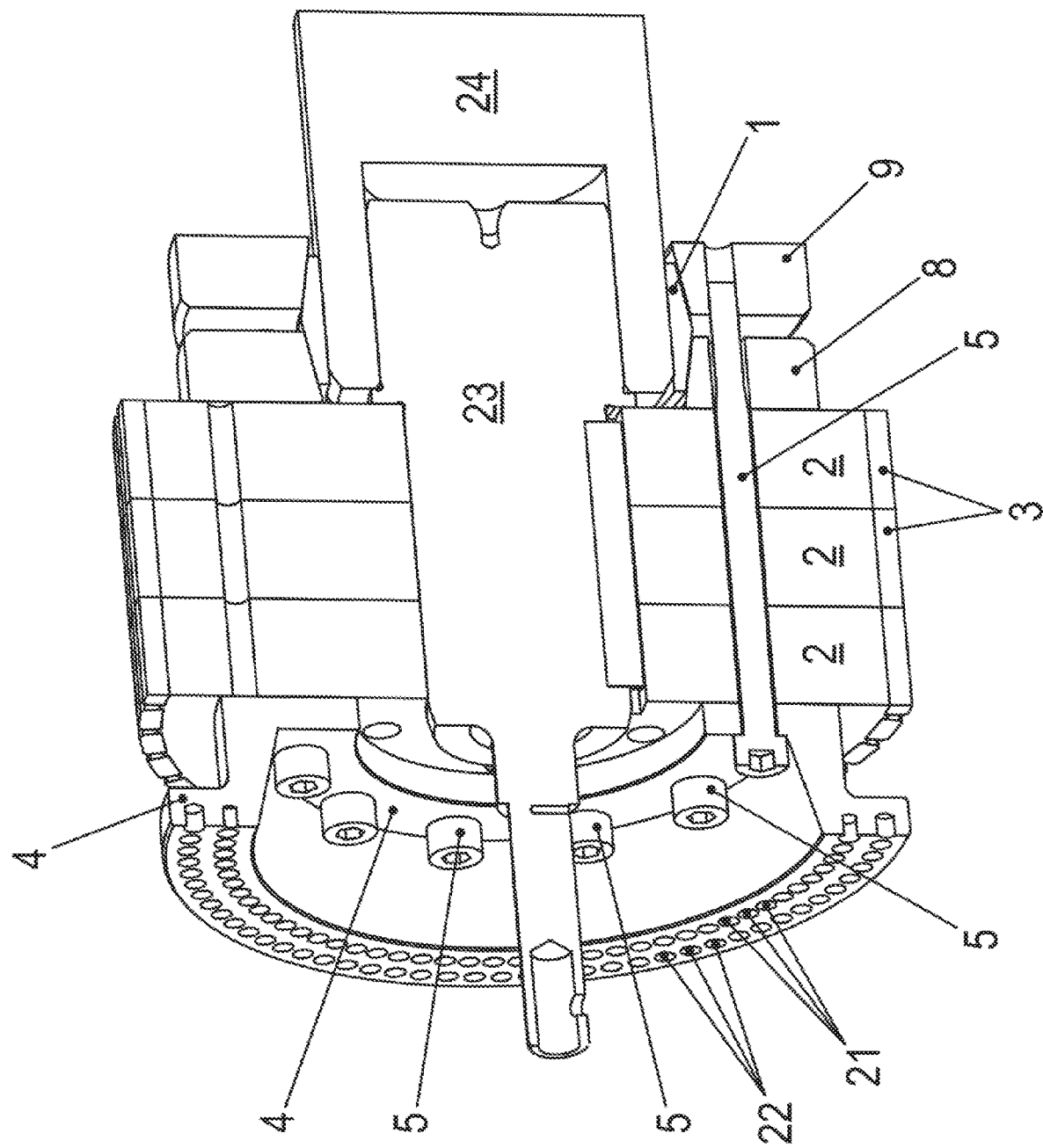
FIG. 2 shows an oblique view of the sectioned rotor of another electric motor according to an example embodiment of the present invention, in which rotor shaft 23 is depicted.
Figure 3:
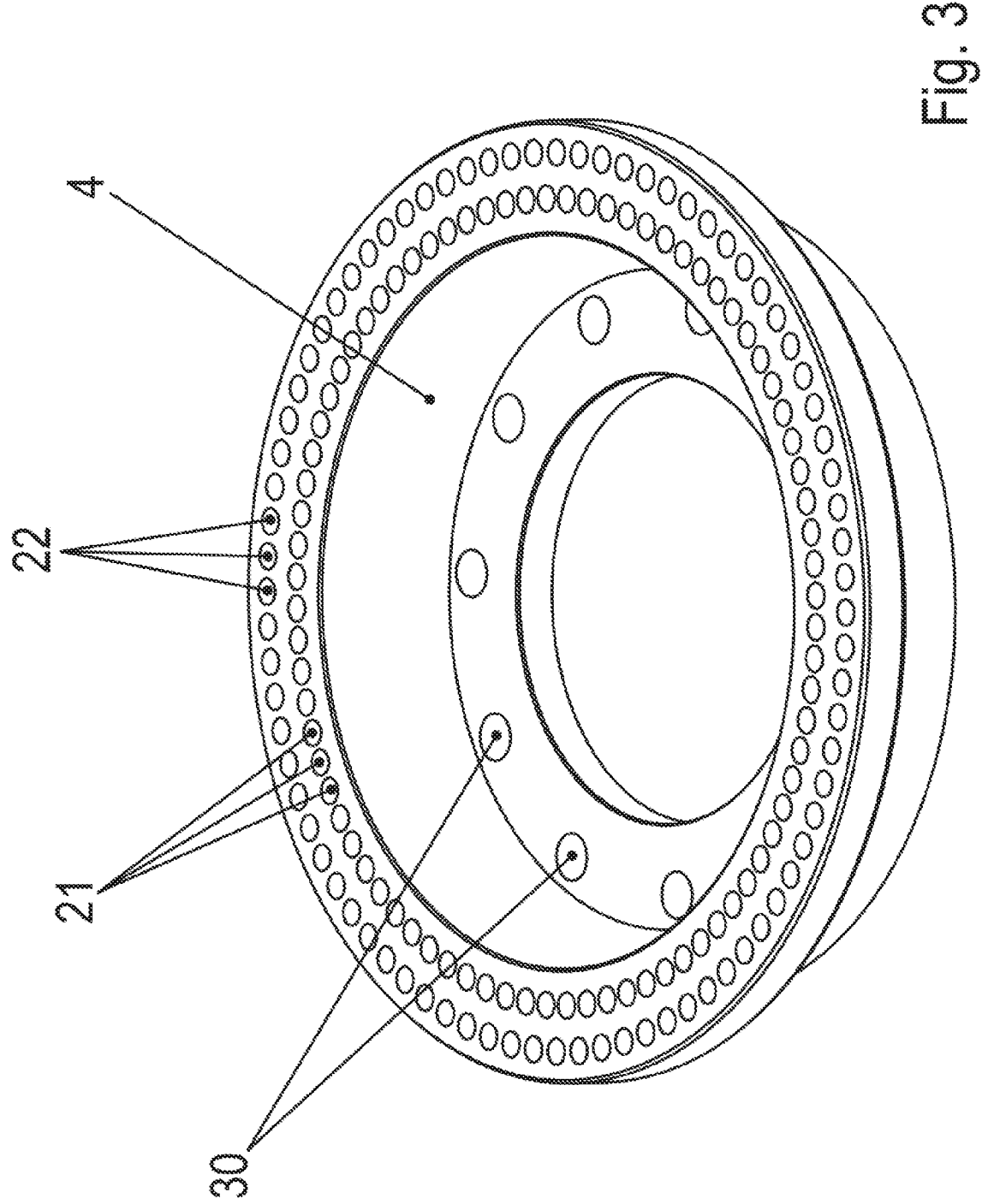
FIG. 3 shows an oblique view of the centering disk 4 of the motor shown in FIG. 2.

However, as illustrated in FIG. 2 and FIG. 3, instead of radially spaced recesses 7, recesses 21 are disposed at a first radial distance, and recesses 22 are disposed at a second radial distance, the second radial distance being greater than the first radial distance.

Thus, collar section 6 covers a radial distance region that is greater than the radial distance region covered by clamping screws 5 and greater than the radial distance region covered by recesses 30 that accommodate clamping screws 5.

In addition, recesses 30 of centering disk 4, through which clamping screws 5 are guided, are situated axially closer to rotor segments 2 than collar section 6 of the centering disk.

Thus, the radial distance of recesses 7, 21 and 22 is greater than the radial distance of recesses 30.

As illustrated in FIG. 2, the rotor packet is pressed onto rotor shaft 23 and is thereby connected to the rotor shaft 23 in a torsionally fixed manner.

Rotor shaft 23 is introduced into hollow shaft 24; hollow shaft 24 is shrunk-fit and retained on rotor shaft 23 with the aid of a shrink disk 1 that surrounds it in the circumferential direction, and is thus connected to rotor shaft 23 in a torsionally fixed manner. Hollow shaft 24 has a correspondingly thin-walled configuration, and the axial region covered by shrink disk 1 overlaps the axial region covered by the contact area between rotor shaft 23 and hollow shaft 24.

Shrink disk 1 therefore allows for the friction-locked connection between rotor shaft 23 and hollow shaft 24. Thus, the electric motor, in particular rotor shaft 23, is able to drive hollow shaft 24, which is part of a device to be driven by the electric motor.

The electric motor itself may be produced without bearings. Rotor shaft 23 is connected to hollow shaft 24 with the aid of shrink disk 1 only when mounted on the device.

When the rotor is delivered, shrink disk 1 is therefore captively connected to the rotor, i.e. with the aid of clamping screws 5 together with compression rings 8 and 9, as well as to rotor segments 2 and centering disk 4. For this duration of the delivery, that is to say, during transport of the rotor without a connection to the device to be driven, the rotor is secured on the stator of the electric motor, i.e. by a non-rotatable connection.

During the installation on the device to be driven, this securing mechanism is released, and hollow shaft 24 of the device to be driven is connected to rotor shaft 23 by friction locking with the aid of shrink disk 1.

On its radially outer surface, shrink disk 1 includes two oppositely-directed cone sections so that the two compression rings 8 and 9 placed thereon operate shrink disk 1 by coming axially closer, i.e. by exerting pressure on hollow shaft 24, so that it is shrunk-fit on rotor shaft 23.

The axial approaching of the two compression rings is brought about by clamping screws 5, which are screwed into the threaded bore of compression ring 9, that is to say, the compression ring that is axially positioned at a greater distance from rotor segments 2, and are therefore pulled axially toward rotor segments 2 when clamping screws 5 are screwed in further.

In other words, the shrink-on connection is implemented with the aid of clamping screws 5. In this context it is considered advantageous that the implementation is able to be carried out from the direction of the centering disk, that is to say, from the axial side of rotor segments 2 and/or centering disk 4 facing away from shrink disk 1.

Figure 4:
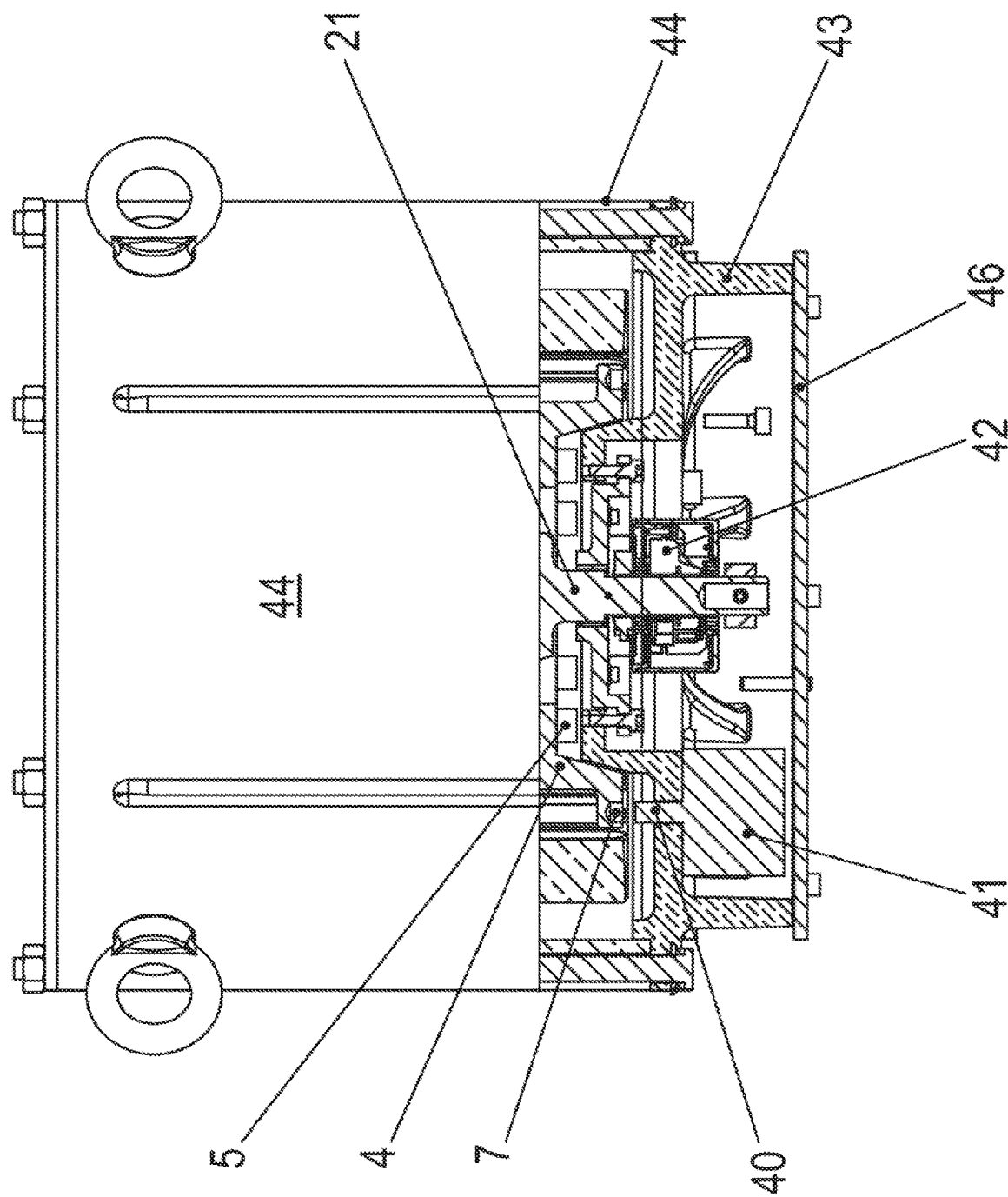
FIG. 4 shows a cross-section through a subregion of the electric motor, in which tappet 40 is not projecting into recess 45.

As illustrated in FIG. 4, the electric motor includes a flange part 43, which is connected to the stator and/or the remaining housing part of the electric motor.

An angle sensor 42 is disposed in the axial end region of rotor shaft 23, which is projecting through centering disk 4.

An electromagnet, which acts as a tractive electromagnet 41 and has an axially guided and movably disposed tappet 40, is situated on flange part 43. When the electromagnet is energized, tappet 40 is attracted, e.g., counter to the spring force generated by a spring element, or in other words, is axially pulled away from centering disk 4. In the non-energized state, the spring element thus introduces the tappet into one of recesses 7 of centering disk 4. Recesses 7 are disposed in the circumferential direction at an angular distance from one another that corresponds to the average play of an electromagnetically actuable friction disk brake. Here, an angular distance between 1° and 5° may be provided. For example, the rotational speed of the electric motor is brought to a very low value prior to energizing the electromagnet, i.e. prior to triggering the brake. In this manner, tappet 40 reliably engages with one of recesses 7.

Tractive electromagnet(s) 41 thus make(s) it possible to implement a retaining function, or in other words, make(s) it possible to prevent the rotary motion of the rotor.

An even finer engagement is able to be achieved by a multi-row configuration, i.e. an arrangement according to FIG. 2 or 3, of centering disk 4. However, a separate traction electromagnet 41 and tappet 40 have to be provided for each row. After one of tappets 40 has engaged, tappet 40 allocated to another row no longer engages because the rows feature an angular offset with respect to one another.

Additional tractive electromagnets 41 including tappets 40 may be provided in further exemplary embodiments according to the present invention, tappets 40 being set apart from one another in the circumferential direction in each case.

For the transport, i.e. prior to the connection to the device to be driven, the rotor of the electric motor is centered on the stator with the aid of centering disk 4. For this purpose, flange part 43 has a surface section on its inner side facing centering disk 4, which is provided in the shape of a conical section. With its aid, a surface section of centering disk 4, correspondingly arranged as a conical section, and especially as an outer conical section, is able to be centered and/or brought into close contact. Using connection screws, e.g., axially directed connection screws, the rotor thusly aligned on flange part 43, i.e. on the stator, is then fixed in place, and only again after rotor shaft 23 has been inserted into hollow shaft 24. Thus, the rotor is then aligned in relation to the shaft to be driven, in particular hollow shaft 24, and is rotatable relative to the stator once the connection screws have been unscrewed. Then, the shrink-fit connection is secured. As a final step the stator windings of the stator are energized, thus making it possible to generate a torque.

When the bearing-free electric motor is connected to the machine to be driven, the stator will also be centered and secured on the housing of the device to be driven. This allows for an accurate operation of the electric motor notwithstanding that the rotor is not directly mounted in the stator, the rotor of the electric motor instead being rotatably mounted via the mounting of hollow shaft 24 of the device to be driven.

Flange part 43 has a recess in which electromagnet(s) 41 and also angle sensor 42 are accommodated and surrounded by flange part 43 and a cover part 46 placed on top, in the manner of a housing.

The press-fit connection device, formed by shrink disk 1 and compression rings 8 and 9, is actuated with the aid of clamping screws 5. Actuating means that the friction-locked connection, in particular the press-fit connection, in particular the shrink-fit connection, between the shaft to be driven, in particular hollow shaft 24, and rotor shaft 23, is induced by screwing in clamping screws 5.

Instead of the shrink disk together with compression rings, additional exemplary embodiments according to the present invention use some other friction-locked or form-locked connection, employing a corresponding press-fit connection. It is important here that when the device is actuated, the connection between hollow shaft 24 and rotor shaft 23 is induced on the one hand, and the actuation via clamping screws 5 takes place on the other. In addition, at least one part of the device, which may possibly be arranged in the form of multiple parts, is to contact the closest adjacent rotor segment 2.

LIST OF REFERENCE NUMERALS 1 shrink disk
2 rotor segment
3 permanent magnets
4 centering disk
5 clamping screw
6 collar section
7 recess, in particular bore hole
8 compression ring
9 compression ring
21 recess at first radial distance
22 recess at second radial distance
23 rotor shaft
24 hollow shaft
30 bore for individual clamping screw 5
40 tappet
41 tractive electromagnet, in particular electromagnet
42 angle sensor
43 flange part
44 stator housing
45 recess for retaining function
46 cover part

The invention claimed is:

1. An electric motor, comprising:
   a rotor; and
   a stator;
   wherein the rotor includes a rotor shaft and a rotor packet mounted on the rotor shaft and connected to the rotor shaft in a torsionally fixed manner, the rotor packet including rotor segments that are stacked on top of one another in an axial direction, a centering disk, and a press-fit connection device; and
   wherein the stacks formed by the rotor segments are arranged between the centering disk and the press-fit connection device.

2. The electric motor according to claim 1, wherein the electric motor is arranged as a bearing-free electric motor.

3. The electric motor according to claim 1, wherein the press-fit connection device includes a shrink-fit connection device including a shrink disk and compression rings.

4. The electric motor according to claim 1, wherein the press-fit connection device is retainable by clamping screws.

5. The electric motor according to claim 1, wherein the press-fit connection device is retainable by clamping screws during transport of the electric motor and/or prior to mounting the electric motor on a device to be driven.

6. The electric motor according to claim 1, wherein the press-fit connection device is actuable by at least one clamping screw in order to establish a press-fit connection between the rotor shaft and (a) a shaft to be driven and/or (b) a hollow shaft.

7. The electric motor according to claim 1, wherein a press-fit connection between the rotor shaft and a shaft to be driven is establishable by actuation of clamping screws and/or by screwing clamping screws into a part of the press-fit connection device.

8. The electric motor according to claim 1, wherein the electric motor includes a flange part that is connected to the stator and/or a stator housing.

9. The electric motor according to claim 8, wherein a surface of the centering disk includes a conical section, and a surface of the flange part has a corresponding conical section so that the two conical sections are resting against each other at least in one section and/or sectionally, the centering disk being connected to the flange part in a detachable manner, by screws, during transport of the electric motor and/or prior to mounting the electric motor on a device to be driven.

10. The electric motor according to claim 8, wherein at least one electromagnet is arranged on the flange part, the electromagnet adapted to move a respective tappet counter to a spring force generated by a spring, such that the respective tappet is engageable with a respective recess of additional recesses.

11. The electric motor according to claim 10, wherein the electromagnet is arranged as a tractive electromagnet.

12. The electric motor according to claim 10, wherein in response to the electromagnet being energized, the tappet is pulled away from the centering disk, and when the electromagnet is not energized, the tappet is pressed into one of the additional recesses by the spring.

13. The electric motor according to claim 1, wherein clamping screws are guided through recesses of the rotor segments and/or the centering disk, the stack being clampable between the centering disk and the press-fit connection device by the clamping screws, the clamping screws in an axial direction and/or in a direction of the rotor axis.

14. The electric motor according to claim 13, wherein the clamping screws are at least partially screwed into respective threaded bores of a part of the press-fit connection device, a head of a respective clamping screw adapted to press the centering disk toward the stack and/or the head resting directly against the centering disk or resting against the centering disk via a washer and/or via a spring washer.

15. The electric motor according to claim 13, wherein the centering disk has additional recesses, which are set apart from one another at regular intervals in a circumferential direction.

16. The electric motor according to claim 15, wherein an angular distance between a respective additional recess and a respective closest adjacent additional recess is between 1° and 5°, a respective tappet being disposed at the same radial distance as an additional recess.

17. The electric motor according to claim 13, wherein additional first recesses are disposed at a first radial distance, and additional second recesses are disposed at a second radial distance, the first radial distance being greater than the second radial distance, the additional first recesses being set apart from one another at regular intervals in a circumferential direction, the additional second recesses being set part from one another at regular intervals in the circumferential direction.

18. The electric motor according to claim 1, wherein permanent magnets are disposed on a radially outer circumference of the respective rotor segment, the rotor segment having a laminated stack on whose radially outer circumference of the respective rotor segment permanent magnets are situated in each case.

19. The electric motor according to claim 1, wherein the press-fit connection device includes a shrink disk and compression rings, and the shrink disk has two conical sections on an outer surface, on which the compression rings are situated in a displaceable manner, and clamping screws are connectable to at least one of the compression rings.

20. The electric motor according to claim 1, wherein at least two electromagnets, arranged as tractive electromagnets, are situated at a radial distance and/or at different radial distances, and respective tappets, which a respective electromagnet is adapted to move counter to a spring force generated by a respective spring, are disposed at different radial distances, and/or a flange part is connected to a cover part such that the electromagnets and an angle sensor are surrounded by the flange part together with the cover part in the manner of a housing.

* * * * *